3,169,093
3,17-DIAMINO ANDROSTANE AND
ANDROSTENE DERIVATIVES
Michael Davis, Upminster, England, assignor to May &
Baker Limited, Essex, England, a British company
No Drawing. Filed Mar. 4, 1963, Ser. No. 262,374
Claims priority, application Great Britain, Mar. 9, 1962,
9,262/62, 9,263/62; Aug. 17, 1962, 31,733/62,
31,734/62
22 Claims. (Cl. 167—65)

This invention relates to steroid derivatives of pharmacological value, to a process for their preparation, and to pharmaceutic compositions containing them.

According to the present invention, there are provided the new androstane and androstene derivatives of the general formula:

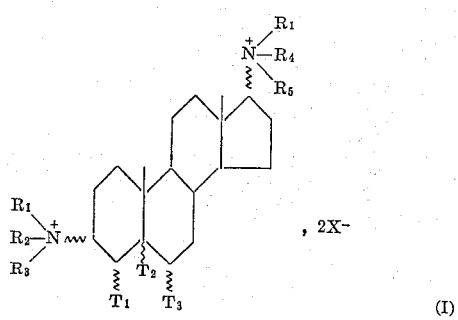

wherein $R_1$ represents an alkyl, alkenyl or aralkyl group, $R_2$, $R_3$, $R_4$, and $R_5$ are the same or different and each represents an alkyl, alkenyl, hydroxyalkyl, aralkyl or cycloalkyl group, or each of the pairs $R_2$ and $R_3$, and $R_4$ and $R_5$, together with the nitrogen atom to which they are attached collectively represent the residue of a saturated mononuclear 5-, 6- or 7-membered heterocyclic ring which may include a second hetero atom, e.g. oxygen or nitrogen, $T_1$, $T_2$ and $T_3$ represent hydrogen atoms, or $T_1$ and $T_2$ together or $T_2$ and $T_3$ together represent a single bond and the remaining T symbol represents a hydrogen atom, and X represents a pharmaceutically acceptable anion, such as a chloride, bromide, tartrate, citrate, phosphate or sulphate ion or an organic sulphonate ion, for example, a methanesulphonate or toluene-p-sulphonate ion. It is to be understood that when $T_2$ is a hydrogen atom it can be either α or β in configuration. Similarly the groups attached in the 3- and 17-positions of the steroid ring may be either α or β in configuration.

By the terms "alkyl" and "alkenyl" as used throughout this specification and accompanying claims is meant alkyl and alkenyl groups containing up to six carbons atoms. Examples of the types of groups which may be represented by the symbols $R_1$—$R_5$ are methyl, ethyl, allyl, hydroxyethyl, benzyl and cyclohexyl groups, and examples of the types of heterocyclic groups included within the definition of the groupings $R_2R_3N$— and $R_4R_5N$— are pyrrolidino, piperidino, piperazino, 4-acylpiperazino, morpholino and hexamethyleneimino groups.

The compounds of Formula I possess pharmacological properties which render them useful as neuromuscular blocking agents. For example, the compounds of general Formula I wherein the groups $R_1$ are methyl or ethyl groups both $R_2$ and $R_3$, and $R_4$ and $R_5$, form part of a pyrrolidine or piperidine ring, $T_1$, $T_2$ and $T_3$ are hydrogen atoms ($T_2$ being of the α-configuration) and X is a chloride or an iodine ion, such as 3β,17β-dipyrrolidino-5α-androstane dimethochloride, and dimethiodide and diethiodide, and 3β,17β-dipiperidino-5α-androstane dimethiodide are short-acting neuromuscular blocking agents, which have a competitive type of action like tubocurarine, and are devoid of the depolarising action seen in suxamethonium salts. From results of experiments in cats with 3β,17β-dipyrrolidino-5α-androstane dimethiodide (referred to hereafter as "Compound A") or the corresponding dimethochloride, and suxamethonium, while it was not possible to obtain an accurate estimate of the relative potencies of the two compounds because their effects were mutually antagonistic (this would be expected from the actions of a competitive blocker and a depolarizing agent), in thirty five experiments the two compounds were roughly equipotent usually requiring about 0.1 to 0.2 mg./kg. to produce a transient block. They were equipotent not only in the extent but also in the duration of the block, which lasted about 3 minutes. In fifteen experiments with Compound A and known drugs the comparative figures for the effective dose ($ED_{95}$) were as follows.

| Compound: | $ED_{95}$, mg./kg. |
|---|---|
| Compound A | 0.14±0.06 |
| Gallamine | 0.86+0.16 |
| Tubocurarine | 0.1±0.01 |
| Suxamethonium | 0.18±0.03 |

Hence, 3β,17β-dipyrrolidino-5α-androstane dimethiodide and dimethochloride are more active than gallamine and approximately equipotent with tubocurarine. They have a similar type of action to those of the aforesaid drugs and possess the advantage over them in that they have a shorter duration of action. They are equipotent with suxamethonium salts, but unlike such salts they have no depolarising effect (which effect causes initial contraction of the muscle or fasciculations followed by relaxation and hence produces post-operative pain) and their effect can be reversed by anticholinesterases such as neostigmine.

Preferred compounds of the present invention are those of Formula I in which $R_1$ represents a methyl or ethyl group, and the groupings $R_2R_3N$— and —$NR_4R_5$ each represent a pyrrolidino, piperidino, morpholino, hexamethyleneimino, dimethylamino or diethylamino group; in particular, the dimetho- and dietho- salts (preferably the chlorides, bromides or iodides) of 3β,17β-dipyrrolidino-5α-androstane, 3β,17β-dipiperidino-5α-androstane, 3β,17β-dimorpholino-5α-androstane, 3β,17β-dihexamethyleneimino-5α-androstane, 3α,17β-dipiperidino-5α-androstane, 3β,17β-dipyrrolidinoandrost-5-ene, 3β,17β-bisdimethylamino-5α-androstane and 3β,17β-bisdiethylamino-5α-androstane. Of outstanding importance are the dimetho-chlorides, bromides or iodides, or dietho-chlorides, bromides or iodides, of 3β,17β-dipyrrolidino-5α-androstane and 3β,17β-dipiperidino-5α-androstane.

The 3,17-bis-quaternary salts of Formula I may be prepared by the application of any of the general methods heretofore known for the production of bis-quaternary ammonium salts. Thus, according to a feature of this invention, the androstane and androstene derivatives of Formula I are prepared by the quaternisation of the tertiary amino groups of a compound of the formula:

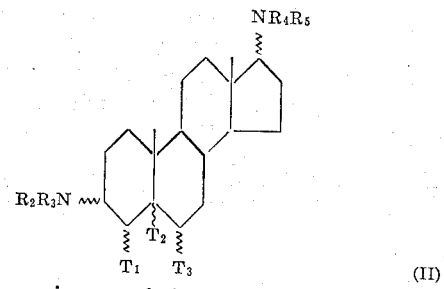

(wherein the various symbols are as hereinbefore defined) by reaction with a reactive ester of the formula $R_1X_1$ (wherein $X_1$ represents the acid residue of a reactive ester, and $R_1$ is as hereinbefore defined) followed, where the anion $X_1$ in the resultant bis-quaternary salt is different to that desired in the final product, by conversion of the salt so formed into the required salt, e.g. by metathesis or through the hydroxide. Preferably the acid residue in the reactant $R_1X_1$ is a halogen atom or a sulphuric or sulphonic acid residue, e.g. a methanesulphonyloxy or toluene-p-sulphonyloxy group. The reaction is advantageously carried out in an inert organic solvent medium such as an alcohol (e.g. methanol) or aromatic hydrocarbon (e.g. benzene).

Salts not directly obtainable by the aforesaid process e.g. the tartrates, citrates and phosphates, can be formed from salts so obtained by direct metathesis, for example by reaction with the silver salt of the appropriate acid, or through the hydroxide. Where a salt of the present invention is water-soluble it can, according to a feature of this invention, be isolated from aqueous solution by treatment with a water-soluble salt (such as the sodium salt) of 4,4'-diaminostilbene-2,2'-disulphonic acid (which acid—also called amsonic acid—is almost insoluble in water even at boiling point) whereby the amsonate containing the required cation is precipitated, formation of a hot aqueous solution of the amsonate and treatment of the resulting solution with an acid having the anion of the required quaternary ammonium salt thereby to liberate and precipitate amsonic acid, leaving the quaternary ammonium salt of the acidifying agent in solution in a substantially pure state. These salts may be isolated in a similar manner by using 2,2'-dihydroxy-1,1'-dinaphthylmethane-3,3'-dicarboxylic acid (which acid—also called embonic acid—is also almost insoluble in water even at boiling point).

It will be appreciated that these separation procedures can be applied to the conversion of a salt directly obtainable by the aforesaid procedure (e.g. a halide) into a corresponding salt (e.g. tartrate, citrate or phosphate) which is not directly obtainable by these procedures. Thus, by starting with an aqueous solution containing the corresponding halide and reacting the resultant amsonate, not with a hydrohalic acid but with tartaric acid, the final product obtained is the corresponding tartrate. In addition, one soluble salt may be converted into another soluble salt by the use of an ion-exchange resin. For example, a methiodide may be converted into a methochloride by passing through a column packed with IR-400 ion exchange resin (chloride form).

The 3,17-tertiary amines of Formula II may be prepared by the application of known methods for the preparation of 3- and 17-tertiary amino-steroids; in particular they may be prepared by the following methods:

(a) Reductive amination of the ketone group(s) in the 3- or 17-position, or 3- and 17-positions, of an androstane or androstene derivative of the formula:

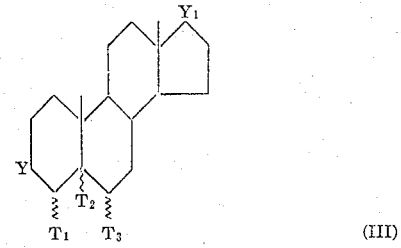

wherein either one of the symbols Y and $Y_1$ represents an oxo group and the other a grouping $R_2R_3N$— or —$NR_4R_5$ respectively, or Y and $Y_1$ both represent oxo groups, and $T_1$, $T_2$, $T_3$, $R_2$, $R_3$, $R_4$ and $R_5$ are as hereinbefore defined. The reductive amination may be effected with hydrogen in the presence of a suitable hydrogenation catalyst, e.g. palladised charcoal, and ammonia or an amine $HNR_2R_3$ or $HNR_4R_5$, or by a Leuckart-Wallach reaction involving the use of ammonia or an amine $HNR_2R_3$ or $HNR_4R_5$, or formyl derivative thereof, and formic acid. When ammonia is employed as reactant the aminosteroid obtained is appropriately alkylated to form a compound of Formula II. The alkylation may, for example, be effected with a suitable reactive alkyl ester or, in the case of methylation, with formaldehyde and formic acid.

(b) Reaction of a reactive ester of an androstane or androstene derivative of the same formula as Formula III but wherein either one of the symbols Y and $Y_1$ represents the acid residue of a reactive ester (e.g. a halogen atom or methanesulphonate or toluene-p-sulphonate group) and the other a grouping $R_2R_3N$— or —$NR_4R_5$ respectively, or Y and $Y_1$ both represent the acid residues of reactive esters, with an appropriate amine of the formula $HNR_2R_3$ or $HNR_4R_5$.

(c) Reduction by methods known per se of the carbonyl group(s) to methylene of an androstane or androstene derivative of the same formula as Formula III but wherein either of the symbols Y and $Y_1$ represents an acylamido group, e.g. N-methyl-acetamido, known to be capable of conversion to a tertiary amino group $R_2R_3N$— or —$NR_4R_5$, and the other represents a grouping $R_2R_3N$— or —$NR_4R_5$ respectively, or Y and $Y_1$ both represent acylamido groups capable of conversion as aforesaid. The reduction of the carbonyl group(s) is preferably effected with a metal hydride such as lithium aluminium hydride.

(d) Reduction by methods known per se, e.g. catalytic hydrogenation, of the aldimine or ketimine grouping(s) of an androstane or androstene derivative of the same formula as Formula III but wherein either one of the symbols Y and $Y_1$ represents a grouping

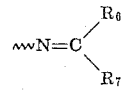

in which $R_6$ represents an alkyl or hydroxyalkyl group containing up to 5 carbon atoms in the alkyl group or moiety, or a cycloalkyl or aryl group, and $R_7$ represents a hydrogen atom or an alkyl group ($R_6$ and $R_7$ being such that the group $=CR_6R_7$ contains a maximum of 6 carbon atoms in an alkylidene grouping), and the other symbol represents a grouping $R_2R_3N$— or —$NR_4R_5$ respectively, or Y and $Y_1$ both represent groupings of the formula $\sim N=CR_6R_7$, followed by alkylation of the secondary amino group(s) in the resultant product.

(e) In the case of those compounds of Formula II in which either or both of the groupings $R_2R_3N$— and —$NR_4R_5$ represent the residue of a saturated mononuclear heterocyclic ring, reaction of an androstane or androstene derivative of the same formula as Formula III but wherein either one of the symbols Y and $Y_1$ represents a primary amino group and the other represents a group $R_2R_3N$— or —$NR_4R_5$ respectively, or Y and $Y_1$ both represent primary amino groups, with a reactive diester $X_1$—A—$X_1$ (wherein $X_1$ is as hereinbefore defined, and A is such that the grouping

represents a saturated mononuclear 5-, 6-, or 7-membered heterocyclic ring, which may include another hetero atom in addition to the nitrogen atom). When Y and $Y_1$ both represent $\sim NH_2$ groups, to obtain the desired starting material of Formula II in which the groupings $R_2R_3N$— and —$NR_4R_5$ represent heterocyclic groups two molecular equivalents of the diester reactant (e.g. 1,4-dibromobutane) will be required for each equivalent of 3,17-diaminoandrost-ane or -ene employed.

(f) Reduction by methods known per se of an enamine formed by reaction of an androstan- or androsten-3(or 17)-one with a secondary amine $HNR_2R_3$ or $HNR_4R_5$, the androstanone or androstenone starting material carrying an appropriate amine substituent in the 17 (or 3)-position of the steroid nucleus. The reduction of the enamine may be effected with sodium borohydride.

(g) Reduction by methods known per se of the ketimine group(s), for example by catalytic hydrogenation or with sodium borohydride, of a steroid compound corresponding to Formula II in which either or both of the groups in the 3- and/or 17-positions of the androstane or androstene ring are of the formula >C=NR₂ (the carbon atom being part of the steroid ring, and R₂ being a group as hereinbefore defined in respect of that symbol), followed by alkylation of the secondary amino group(s) in the resultant product.

(*h*) Formation of a primary amino group in the 3- or 17-position of the steroid nucleus by (i) Reduction by methods known per se, for example catalytic hydrogenation, or reaction with lithium aluminium hydride or with sodium and an alcohol, of an azide, oxime, phenylhydrazone or other suitable nitrogen-containing derivative of a 3 (or 17)-aminoandrostane;

(ii) Hofmann, Curtius or Schmidt reaction on a suitable 3 (or 17)-carboxylic acid derivative of a corresponding androstane or androstene compound, or (iii) Hydrolysis in manner known per se, for example with hydrochloric acid in acetic acid, of the isocyanato group of an androstane or androstene compound substituted in the 3- or 17-position by an isocyanato group, followed by alkylation of the primary amino group in the resultant product to a grouping R₂R₃N— or —NR₄R₅.

In this method the steroid nucleus of the starting material is substituted in the 3- or 17-position not carrying a group convertible to —NH₂ by a tertiary amine group R₂R₃N— or —NR₄R₅ respectively.

(*i*) Reduction of an androstane or androstene compound carrying an isocyanato group in one of the 3- and 17-positions and in the other a tertiary amino group R₂R₃N— or —NR₄R₅ respectively, by methods known per se for reducing the group —NCC to —NHCH₃ (for example, with lithium aluminium hydride), followed by alkylation of the resultant methylamino group in the resultant product.

The method employed, or methods employed and their sequence, will depend on the starting materials of Formula II required. Where similar tertiary amino groups are required in the 3- and 17-positions, they may be introduced either simultaneously or successively, in either order. For example, 5α-androstane-3,17-dione may be converted by treatment with pyrrolidine and formic acid directly into a mixture of isomeric 3,17-dipyrrolidino-5α-androstanes, which may be separated to give pure isomers. Alternatively, androst-5-en-3β-ol-17-one may be converted successively into 17-pyrrolidino-androst-5-en-3β-ol, 17-pyrrolidino-5α-androstan-3β-ol (which can itself be prepared directly from 5α-androstan-3β-ol-17-one, pyrrolidine and formic acid), 17-pyrrolidino-5α-androstan-3-one and thence into the above 3,17-dipyrrolidino compound or another appropriate 3-amine, as shown in the following reaction scheme, where R₂ and R₃ are as hereinbefore defined:

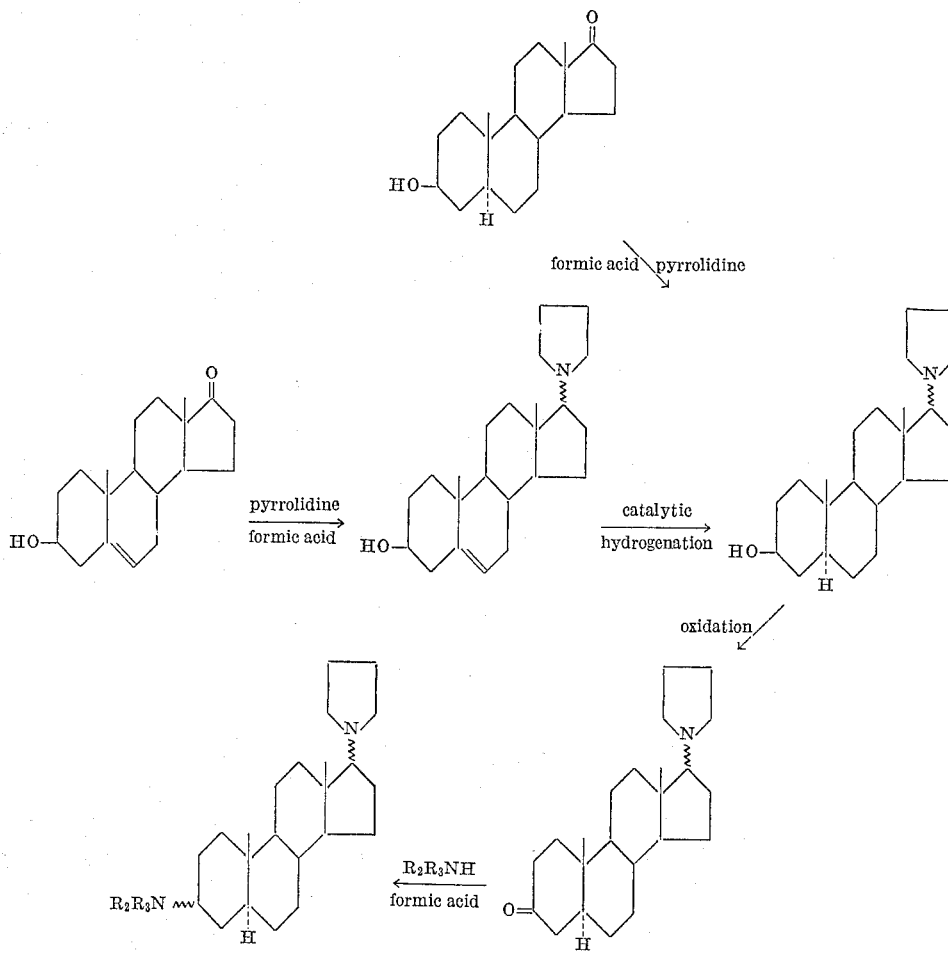

Alternatively, the basic group may be introduced first in the 3-position, and subsequently a similar or different basic group may be introduced into the 17-position. Other alternative reaction sequences will be obvious to those skilled in the art.

According to a further feature of the invention, the compounds of general Formula I in which T₁ and T₂ together, or T₂ and T₃ together, form a single bond (i.e. the androst-4-enes and androst-5-enes) may be converted to the corresponding compounds where T₁, T₂ and T₃ are hydrogen atoms (i.e. the androstanes) by methods known per se, for example, by catalytic hydrogenation using a platinum oxide catalyst under suitable conditions.

By the term "methods known per se" as used in this specification is meant methods heretofore used or described in the chemical literature.

The following examples illustrate the invention.

*Example I*

A mixture of 5α-androstane-3,17-dione (2.5 g.), morpholine (7.0 ml.) and formic acid (2.5 ml.) was heated in a sealed tube at 170±10° C. for 16 hours, cooled and poured into dilute aqueous sodium hydroxide. The resulting solid was filtered off, washed with water and crystallised from acetone giving 3β,17β-dimorpholino-5α-androstane, M.P. 168–170° C.

Similarly prepared were: 3β,17β-dipiperidino-5α-androstane, M.P. 158–160° C. (dihydrochloride, M.P. above 330° C.), and 3β,17β-di(hexamethyleneimino)-5α-androstane, M.P. 102–104° C.

These amines were converted into the dimethiodides as follows:

A mixture of 3β,17β-dipiperidino-5α-androstane (180 mg.), methyl iodide (1.8 ml.) and methanol (5.4 ml.) was refluxed for 3 hours, then concentrated and diluted with ether. The solid product was recrystallised from water with the addition of sodium iodide, and boiled with acetone, giving 3β,17β-dipiperidino-5α-androstane dimethiodide, M.P. above 315° C.

Similarly obtained were 3β,17β-di(hexamethyleneimino)-5α-androstane dimethiodide, M.P. 250–255° C., and 3β,17β-dimorpholino-5α-androstane dimethiodide (prepared by heating for 24 hours at 100° C. in a sealed tube), M.P. above 300° C.

*Example II*

A mixture of 5α-androstane-3,17-dione (5.0 g.), formic acid (10.0 ml.) and pyrrolidine (30.0 ml.) was heated under reflux at 170±10° C. for 20 hours, cooled and poured into dilute aqueous sodium hydroxide. The solid which separated was filtered off, washed with water and dissolved in dilute methanesulphonic acid. The resulting solution was filtered and basified, and the amine which separated was filtered off, washed with water, dried and crystallised from ethyl acetate, yielding 3β,17β-dipyrrolidino-5α-androstane, M.P. 155–158° C. (dihydrochloride, M.P. >320° C.).

A solution of the dipyrrolidino compound (1.83 g.) in benzene (40 ml.) and methyl iodide (15 ml.) was refluxed for 3 hours. After cooling, the mixture was diluted with ether and filtered. Recrystallisation of the solid product from n-butanol gave 3β,17β-dipyrrolidino-5α-androstane dimethiodide (2.91 g.), M.P. above 320° C.

Similarly obtained was 3β,17β-dipyrrolidino-5α-androstane diethiodide, which melts above 310° C.

The aforesaid bis quaternary salts were also prepared by refluxing the dipyrrolidino compound with methyl iodide in methanol or ethyl iodide in ethanol, respectively.

*Example III*

A mixture of androst-5-en-3β-ol-17-one (20 g.), formic acid (98–100%; 20 ml.) and pyrrolidine (60 ml.) was heated under reflux (bath temperature 160–180° C.) for 20 hours, then cooled and added with stirring to 20% aqueous sodium hydroxide (300 ml.). The resulting suspension was diluted with water, and was separated from non-basic material by dissolution in aqueous methanesulphonic acid and filtration. The base, after liberation from the said acid solution by addition of excess alkali, was crystallised from acetone, giving 17β-pyrrolidinoandrost-5-en-3β-ol (20.06 g.), M.P. 196–198° C. The hydrochloride melted at 312–314° C., the acetate melted at 146–148° C., the methiodide melted at 265–266° C. and the methotoluene-p-sulphonate melted at 191–194° C. or 221–229° C.

Similarly prepared was 17β-piperidinoandrost-5-en-3β-ol, M.P. 178–180° C. (hydrochloride, M.P. 286–293° C., methiodide decomposes above 266° C.).

17β-pyrrolidinoandrost-5-en-3β-ol (3.23 g.) in glacial acetic acid (100 ml.) was reduced with hydrogen, in the presence of platinum oxide (0.81 g.) as catalyst, at 23° C. and 70 lbs./sq. in. hydrogen pressure. After reduction, the mixture was filtered and the filtrate evaporated under reduced pressure. The residue was basified and the resulting solid was filtered off, washed and dried. The crude product was hydrolysed by refluxing with ethanolic potassium hydroxide and the resulting amine was purified by chromatography over alumina and crystallisation from ethyl acetate, giving 17β-pyrrolidino-5α-androstan-3β-ol, M.P. 204–208° C.

Similarly prepared was 17β-piperidino-5α-androstan-3β-ol.

Oxidation of 17β-pyrrolidino-5-α-androstan-3β-ol (1.95 g.) in acetic acid (60 ml.) with a solution of chromium trioxide (0.6 g.) in acetic acid (20 ml.) and water (0.5 ml.) gave 17β-pyrrolidino-5α-androstan-3-one which, after chromatography over alumina and crystallisation from ethyl acetate, melted at 180–182° C.

Similarly prepared was 17β-piperidino-5α-androstan-3-one, M.P. 184–185° C.

Treatment of 17β-pyrrolidino-5α-androstan-3-one with pyrrolidine and formic acid, and subsequent methylation of the product with methyl iodide as described in Example I, afforded 3β,17β-dipyrrolidino-5α-androstane dimethiodide.

Similarly obtained were 3β,17β-dipiperidino-5α-androstane, M.P. 158–160° C., and its dimethiodide.

*Example IV*

A mixture of 17β-aminoandrost-5-en-3β-ol (145 mg.), 1,4-dibromobutane (113 mg.), anhydrous sodium carbonate (106 mg.) and ethanol (10 ml.) was refluxed for 16 hours, evaporated, basified and extracted with chloroform. The washed and dried chloroform extract was evaporated and the residue was crystallised from acetone to give 17β-pyrrolidinoandrost-5-en-3β-ol, M.P. 195–197° C., which was converted into 3β,17β-dipyrrolidino-5α-androstane dimethiodide as described in Example III.

*Example V*

A mixture of 5α-androstan-3β-ol-17-one (4.0 g.), formic acid (8 ml.) and pyrrolidine (8 ml.) was heated under reflux at 160–180° C. for 16 hours, then poured into excess 20% aqueous sodium hydroxide. The solid which separated, was collected by filtration, washed, dried and crystallised from a mixture of benzene and light petroleum (B.P. 40–60° C.) to give 17β-pyrrolidino-5α-androstan-3β-ol, M.P. 202–205° C. A recrystallised specimen melted at 206–209° C. The corresponding hydrochloride decomposed at 310° C. and the methiodide melted at 256–257° C. Similarly prepared was 17β-piperidino-5α-androstan-3β-ol, M.P. 174–176° C.

These amines were converted into 3β,17β-dipyrrolidino-5α-androstane dimethiodide and 3β,17β-dipiperidino-5α-androstane dimethiodide, respectively, as described in Example III.

*Example VI*

A mixture of 5α-androstane-3,17-dione (5 g.), formic acid (20 ml.) and piperidine (20 ml.) was heated under reflux at 170° C. for 16 hours, cooled and poured into water. The solution was basified and extracted with benzene. The washed and dried extract was evaporated and the residue, in ether, was treated with ethereal hydrochloric acid. The crude hydrochloride was crystallized from water by the addition of sodium chloride then reconverted into the base and successively crystallised from light petroleum (B.P. 80–100° C.) and ethyl acetate, giving 3β-piperidino-5α-androstan-17-one, M.P. 167–169° C. The aqueous mother liquors from the crystallisation of the hydrochloride gave further basic material which, after chromatography on alumina, afforded 3α,17β-

(M.P. 165–166° C.) and 3β,17β-dipiperidino-5α-androstane, M.P. 158–160° C.

A mixture of 3β-piperidino-5α-androstan-17-one (0.8 g.), formic acid (1.0 ml.) and pyrrolidine (3.0 ml.) was heated under reflux at 170° C. for 22 hours. The base obtained, isolated in a similar manner to that described in Example I, was crystallised from ethyl acetate, giving 3β-piperidino-17β-pyrrolidino-5α-androstane, M.P. 168–170° C., which was converted in the usual manner into the dimethiodide, M.P. above 300° C.

Similarly obtained, using the appropriate intermediates, were 3β-dimethylamino-17β-pyrrolidino-5α-androstane, M.P. 80–81° C. [dimethiodide, M.P. 297° C. (decomp.)], and 3β-morpholino-17β-pyrrolidino-5α-androstane, M.P. 115–117° C. [dimethiode, M.P. 280° C. (decomp.)].

*Example VII*

A solution of 17β-pyrrolidino-5α-androstan-3β-ol (1 g.) (prepared as described in Example V), in dry pyridine (10 ml.) was treated with toluene-p-sulphonyl chloride (1 g.), kept overnight, diluted with water and basified with sodium hydroxide. The solid product was washed and crystallised from methanol, giving the 3-tosylate, M.P. 140–143° C.

A mixture of the foregoing tosylate (250 mg.) and pyrrolidine (2 ml.) was heated at 100° C. under reflux for 24 hours, diluted with water, basified and filtered. The solid base obtained was washed with water and crystallised from purified ethyl acetate, giving 3α,17β-dipyrrolidino-5α-androstane, M.P. 148–150° C., which on treatment with methyl iodide in either methanol or benzene afforded the dimethiodide, M.P. 281° C. (efferv.).

Similarly prepared, using the appropriate intermediates, were 3α,17β-dipiperidino-5α-androstane, M.P. 166–168° C. [dimethiodide, M.P. 281–284° C. (decomp.)], and 17β-dimethylamino-3α-pyrrolidino-5α-androstane, M.P. 170–174° C. [dimethiodide, M.P. 279–283° C. (decomp.)].

*Example VIII*

5α-androstane-3,17-dione (7.2 g.) was treated with pyrrolidine (14.4 ml.) and formic acid (14.4 ml.) as described in Example II. After removal of the principal product, 3β,17β-dipyrrolidino-5α-androstane, the mother liquors were evaporated and the residue was chromatographed over alumina, giving 3α,17β-dipyrrolidino-5α-androstane, M.P. 151–154° C., not depressed by a specimen prepared as in Example VII. It was converted into the dimethiodide, M.P. 281° C. (efferv.), as described in Example VII.

Similarly obtained were 3α,17β-dipiperidino-5α-androstane, M.P. 165–166° C., and 3α,17β-dimorpholino-5α-androstane, M.P. 168–170° C. and their dimethiodides.

*Example IX*

A solution of androst-4-ene-3,17-dione (5.0 g.) and redistilled pyrrolidine (1.5 ml.) in ethanol (100 ml., distilled from Raney nickel catalyst) was shaken with hydrogen in the presence of palladised charcoal catalyst (prepared from 170 mg. palladium chloride and 900 mg. acid-washed charcoal). The uptake of hydrogen reached 830 ml. The filtered solution was evaporated and the residue was crystallised from methanol, yielding a 3-pyrrolidino-5β-androstan-17-one, M.P. 179–180° C. (hydrochloride, M.P. >295° C.). Evaporation of the mother liquors and chromatography of the residue on activated alumina gave a further quantity of the amine, together with some 3α-pyrrolidino-5α-androstan-17-one, M.P. 148–150° C.

A mixture of 3-pyrrolidino-5β-androstan-17-one (0.5 g), M.P. 179–180° C., pyrrolidine (1.5 ml.) and formic acid (0.5 ml.) was heated under reflux at 170±10° C. for 16 hours, then cooled and poured into dilute aqueous sodium hydroxide. The solid was filtered off, washed with water and crystallised from acetone, giving 3,17β-dipyrrolidino-5β-androstane, M.P. 120–121.5° C., which with methyl iodide in methanol afforded the dimethiodide, M.P. 278–282° C.

*Example X*

17β-pyrrolidinoandrost-5-en-3β-ol (8.86 g.) (prepared as described in Example III) was dissolved in redistilled cyclohexanone (45 ml.) and dry toluene (355 ml.) and toluene (100 ml.) was distilled off through a short fractionation column. A solution of aluminium isopropoxide (3.10 g., freshly distilled) in dry toluene (89 ml.) was added and the solution was slowly distilled during 2.5 hours, further dry toluene (1.33 l.) being continuously added to replace that removed by distillation. After a further ½ hour, the solution was steam-distilled, basified and extracted with chloroform. The washed and dried extract was evaporated and the residue was boiled for 2 minutes with methanol (100 ml.) and pyrrolidine (10 ml.), then cooled and filtered, yielding 17β-pyrrolidinoandrost-4-en-3-one pyrrolidine enamine (5.33 g.), M.P. 158–164° C.

A suspension of 17β-pyrrolidinoandrost-4-en-3-one pyrrolidine enamine (1 g.) in methanol (50 ml.) was stirred whilst sodium borohydride (1 g.) was slowly added during 4 hours, then poured into dilute acid. The filtered solution was basified and extracted with benzene and the washed and dried extract was evaporated. Crystallisation of the residue from ethyl acetate afforded 3β,17β-dipyrrolidinoandrost-5-ene, M.P. 179–180° C., which was converted by treatment with methyl iodide in methanol into the dimethiodide, M.P. above 300° C.

*Example XI*

A solution of 3β,17β-dipyrrolidinoandrost-5-ene (0.7 g.) (prepared as described in Example X) in acetic acid (10 ml.) containing platinum oxide (0.2 g.) was shaken with hydrogen at room temperature and pressure for 6 hours, when the uptake of hydrogen was 80 ml. The filtered solution was evaporated, and an aqueous solution of the residue was basified. The solid product was crystallised from ethyl acetate and then further purified by chromatography on activated alumina, giving 3β,17β-dipyrrolidino-5α-androstane, M.P. 156–160° C., which was converted into the dimethiodide, as described in Example II.

*Example XII*

A solution of 5α-androstane-3,17-dione (1 g.) in ethanol (70 ml.) and pyrrolidine (0.33 ml.) was shaken with hydrogen and 5% palladium charcoal catalyst (0.5 g) at atmospheric temperature and pressure until the uptake reached 80 ml. The basic product, isolated in the usual way, was chromatographed over activated alumina, affording 3α-pyrrolidino-5α-androstan-17-one, M.P. 146–148° C., and 3β-pyrrolidino-5α-androstan-17-one, M.P. 162–163° C.

A mixture of 3α-pyrrolidino-5α-androstan-17-one (0.5 g.), pyrrolidine (1.3 ml.) and formic acid (0.5 ml.) was heated under reflux at 170±10° C. for 8 hours. The basic product, isolated in a similar manner to that described in Example I, was crystallised from acetone, giving 3α,17β-dipyrrolidino-5α-androstane, M.P. 150–153° C., not depressed by a sample prepared as in Example VIII.

3β-pyrrolidino-5α-androstan-17-one was similarly converted into 3β,17β-dipyrrolidino-5α-androstane and thence into the bis-methiodide.

*Example XIII*

A mixture of 5β-androstane-3,17-dione (0.5 g), pyrrolidine (3 ml.) and formic acid (1 ml.) was heated at 180±10° C. in a sealed tube for 16 hours, then cooled and poured into dilute aqueous sodium hydroxide. The solid product was crystallised from acetone giving a 3,17β-dipyrrolidino-5β-androstane, M.P. 122–124° C., depressed to below 100° C. by the isomeric diamine, M.P. 120–121.5° C. described in Example IX. Treatment with methyl iodide in methanol afforded the dimethiodide, M.P. 278–281° C. (decomp.).

Example XIV

A mixture of 3β-morpholino-5α-androstan-17-one (0.5 g., M.P. 167–169° C.; prepared by the method of Example VI), N-methylcyclohexylamine (2.79 g.) and formic acid (0.79 ml.) was heated at 170±10° C., in a sealed tube for 16 hours then poured into dilute aqueous sodium hydroxide and extracted with chloroform. The washed and dried extract was evaporated and the residue was chromatographed on alumina, giving 17β-N-methyl-cyclohexylamino-3β-morpholino-5α-androstane, M.P. 139–142° C., which on treatment with methyl iodide in methanol afforded the dimethiodide, M.P. 249–254° C.

Similarly prepared were 17β-N-methylbenzylamino-3β-morpholino-5α-androstane, M.P. 180–185° C., and its dimethiodide.

Example XV

A mixture of N-ethoxycarbonylpiperazine (11 ml.), 5α-androstane-3,17-dione (2.5 g.) and formic acid (2.5 ml.) was heated in a sealed tube at 180±10° C. for 18 hours, then poured into dilute aqueous sodium hydroxide. Extraction with chloroform and evaporation of the extract gave a gum which was dissolved in aqueous methanesulphonic acid. Non-basic material was removed by ether extraction and the acid solution was basified and re-extracted with chloroform. The residue obtained on evaporation of the chloroform solution was chromatographed on "Florisil" (i.e. a magnesia-silica gel absorbent, 60–100 mesh), affording 3β-N-ethoxycarbonylpiperazino-5α-androstan-17-one, M.P. 148–150° C., and two isomeric 3,17β-di-(N-ethoxycarbonylpiperazino)-5α-androstanes, M.P. 160–163° C. and 126–129° C., which were converted into their dimethiodides.

Example XVI

A solution of 3β,17β-dipyrrolidino-5α-androstane dimethiodide (2.0 g.) in 50% aqueous methanol (20 ml.) was run during 10 minutes through a column of IR-400 ion exchange resin (chloride form, 20 ml. damp solid). The column was washed with more aqueous methanol (40 ml.) and the combined eluates were evaporated in vacuo. The residue was triturated with acetone, and the solid was recrystallised from a mixture of ethanol, acetone and ethyl acetate, giving the dimethochloride, which darkened and decomposed above 260° C.

Example XVII

An aqueous solution of 3β,17β-dipyrrolidino-5α-androstane dimethiodide was added to a solution of 4,4'-diaminostilbene-2,2'-disulphonic acid (amsonic acid) in dilute ammonia. The amsonate was filtered off and crystallized from aqueous ethanol. It did not melt up to 300° C.

The embonate of the dipyrrolidino compound was similarly prepared.

Example XVIII

A mixture of 3β,17β-dipyrrolidino-5α-androstane (0.5 g.), methyl bromide (1 ml.) and methanol (1 ml.) was heated at 100° C. in a sealed tube for 16 hours, then evaporated. The residue was triturated with ether and the solid was crystallized from ethanol-ethyl acetate, giving 3β,17β-dipyrrolidino-5α-androstane dimethobromide, M.P. above 300° C.

Example XIX

A solution of 3β,17β-dipyrrolidino-5α-androstane diethiodide (2.5 g.) in water (600 ml.) was stirred for 2 hours at 100° C. with freshly precipitated silver chloride (from 1.8 g. silver nitrate), then filtered. The solid was washed with water, and the combined filtrates were evaporated in vacuo. The residue was dried azeotropically with benzene and triturated with acetone, giving the diethochloride, M.P. above 305° C.

Example XX

A mixture of 3β,17β-dipyrrolidino-5α-androstane (0.5 g.) and benzyl bromide (3 ml.) was heated at 100° C. for 24 hours then cooled, diluted with ether and filtered. The solid was triturated with acetone and ether, and crystallised from ethanol-ethyl acetate, giving N,N'-dibenzyl-5α-androstane-3β,17β-bispyrrolidinium bromide, M.P. above 300° C.

Example XXI

A mixture of 3β,17β-dipyrrolidino-5α-androstane (360 mg.), redistilled n-propyl bromide (1 ml.) and n-propanol (5 ml.) was heated in a sealed tube at 100° C. for 16 hours, cooled, diluted with ether, and filtered. The solid was crystallised from ethanol and the product was extracted with chloroform. The residue from the chloroform solution was crystallised from water, giving N,N'-dipropyl-5α-androstane-3β,17β-bispyrrolidinium bromide, M.P. above 305° C.

Example XXII

A solution of 3β,17β-dipyrrolidino-5α-androstane (450 mg.) in redistilled allyl chloride (5 ml.) was refluxed for 16 hours, cooled, diluted with ether, and filtered. The solid product was dissolved in boiling water (100 ml.) and the filtered solution was concentrated in vacuo to 4 ml., treated with sodium iodide and cooled. The crystalline product was filtered off, washed with hot acetone, and dried, giving N,N'-diallyl-5α-androstane-3β,17β-bispyrrolidinium iodide, M.P. above 300° C.

Example XXIII

The crude mixture of 3,17-diamino-5α-androstanes (650 mg.) [prepared from 5α-androstane-3,17-dione dioxime by the method of Dodgson and Haworth, J. Chem. Soc., 1952, 67] was heated on the steam-bath with 40% aqueous formaldehyde (6.5 ml.) and formic acid (6.5 ml.) for 20 hours. The solution obtained was diluted with water, basified and the product extracted into benzene. Chromatography of the crude product on alumina gave 3α-17β-bisdimethylamino-5α-androstane, M.P. 136–138° C., and 3β,17β-bisdimethylamino-5α-androstane, M.P. 78–80° C.

A mixture of 3β,17β-bisdimethylamino-5α-androstane (300 mg.), methyl iodide (3 ml.) and methanol (10 ml.) was refluxed for 2 hours, cooled and diluted with ether. The product was recrystallized from aqueous sodium iodide, giving the dimethiodide, M.P. above 300° C.

The dimethiodide, M.P. 296–297° C., of the 3α-17β-epimer was similarly prepared.

Example XXIV

A mixture of 5α-androstane-3,17-dione (4 g.), formic acid (16 ml.) and dimethylformamide (16 ml.) was heated under reflux at 160° C. for 20 hours, then concentrated by distillation until the distillation temperature reached 145° C. Formic acid (16 ml.) was added and the solution was heated at 160° C. for a further 18 hours, basified and extracted with benzene. The washed and dried extract was evaporated and the residue was chromatographed on alumnia, giving successively 3α-17β-bisdimethylamino-5α-androstane, M.P. 136–138° C., 3β-17β-bisdimethyl-5α-androstane, M.P. 75–77° C., and the isomeric amino-5α-androstane, M.P. 75–77° C., and the isomeric 3α- and 3β-dimethylamino-5α-androstan-17-ones, M.P. 140–142° C. and 109–111° C. respectively.

The two bisdimethylamino compounds were converted into methiodides as described in Example XXIII.

Example XXV

5α-androstan-3β-ol-17-one (5.0 g.) was treated with formic acid (10 ml.) and dimethylformamide (10 ml.) at 160–180° C. for 16 hours. The basic product was crystallised from ethyl acetate, giving 17β-dimethylamino-5α-androstan-3β-ol, M.P. 209–210° C.

Oxidation with chromic acid or by the Oppenauer method gave 17β-dimethylamino-5α-androstan-3-one, which on further treatment with dimethylformamide and formic acid yielded 3β-17β-bisdimethylamino-5α-androstane. This diamine was converted to the dimethiodide as described in Example XXIII.

*Example XXVI*

Toluene-p-sulphonyl chloride (0.6 g.) was added at −20° C. to a solution of 17β-dimethylamino-5α-androstan-3β-ol (0.6 g., prepared as described in Example XXV) in dry pyridine (6 ml.) and the solution was kept overnight at room temperature, then diluted with water, made slightly alkaline and filtered. The solid product was washed and dried, and crystallised from light petroleum (B.P. 80–100° C.) giving 17β-dimethylamino-5α-androstan-3β-yl toluene-p-sulphonate, M.P. 151–155° C.

A solution of this toluene-p-sulphonate (200 mg.) in liquid dimethylamine (10 ml.) was heated in a Carius tube at 100° C. for 20 hours. Excess of dimethyamine was allowed to evaporate, and the residue was washed with dilute aqueous sodium hydroxide and water, then purified by chromatography over alumina. After recrystallisation from ethyl acetate, 3α-17β-bisdimethylamino-5α-androstane, M.P. 138–141° C., was obtained, identical with a specimen prepared as in Example XXIV. It was converted to the dimethiodide as described in Example XXIII.

*Example XXVII*

A mixture of 5α-androstane-3,17-dione (5 g.), formic acid (5.5 ml.) and N-methylbenzylamine (22 ml.) was treated under reflux at 140–160° C. for 3 days, then concentrated in vacuo. The residue was basified and extracted with benzene, and the extract was shaken with 2 N aqueous hydrochloric acid. The acid solution was basified and re-extracted with benzene, and the washed and dried extract was evaporated. Trituration of the residue with acetone, and crystallisation from ethyl acetate gave 3β,17β - di(N-methylbenzylamino)-5α-androstane, M.P. 129–131° C., which on treatment with methyl iodide in methanol afforded the dimethiodide, M.P. above 300° C.

*Example XXVIII*

A mixture of 5α-androstane-3,17-dione (2.5 g.), diethylamine (8.2 ml.) and formic acid (2.5 ml.) was heated in a sealed tube at 180° C. for 65 hours, then basified and extracted wtih ether. The basic fraction was separated by treatment with hydrochloric acid, and the base was recovered and chromatographed on alumina. Elution of the column gave successively two isomeric diamines, considered to be 3α,17β-bisdiethylamino-5α-androstane, M.P. 103–104° C., and 3β,17β-bisdiethylamino-5α-androstane, M.P. 100–101° C.

Treatment of 3β,17β - bisdiethylamino-5α-androstane with methyl iodide in methanol afforded the dimethiodide, M.P. 275° C. (decomp.).

The dimethiodide of the 3α,17β-diamine was similarly prepared.

*Example XXIX*

A mixture of androst-5-en-3β-ol-17-one (5 g.), formic acid (5.3 ml.) and N-methylbenzylamine (21 ml.) was heated under reflux at 170° C. for 22 hours, then cooled and poured into aqueous sodium hydroxide. The solid was filtered off and crystallised from acetone and from light petroleum (B.P. 80–100° C.) giving 17β-N-methylbenzylaminoandrost-5-en-3β-ol, M.P. 199–202° C.

A solution of 17β-N-methylbenzylaminoandrost-5-en-3β-ol (1 g.) in acetic acid (40 ml.) was shaken with hydrogen and Adams' platinum oxide (400 mg.) at room temperature and pressure until the uptake ceased. The filtered solution was evaporated and an aqueous solution of the residue was basified and filtered. The solid product was crystallised from ethyl acetate, giving 17β-N-methylbenzylamino - 5α - androstan-3β-ol, M.P. 170—172° C.

A solution of 17β-N-methylbenzylamino-5α-androstan-3β-ol (5 g.) in acetic acid (80 ml.) and chromium trioxide (5 g.), in water (5 ml.) and acetic acid (20 ml.) was allowed to stand at room temperature for 20 hours. Methanol (20 ml.) was added and the solution poured into water, basified, and extracted with chloroform. The dried extracts were evaporated and the residue, dissolved in benzene, was passed through an alumina column. The solid product, after crystallisation from light petroleum (B.P. 80–100° C.), afforded 17β-N-methylbenzylamino-5α-androstan-3-one, M.P. 155–157° C.

A mixture of 17β-N-methylbenzylamino-5α-androstan-3-one (0.5 g.), N-methylcyclohexylamine (3 ml.) and formic acid (1 ml.) was heated at 160° C. for 5 hours and poured into dilute aqueous sodium hydroxide. The solid was chromatographed on alumina and crystallised from acetone, giving 17β-N-methylbenzylamino-3β-N-methylcyclohexylamino-5α-androstane, M.P. 109–111° C. Treatment with methyl iodide in methanol afforded the dimethiodide, which softens from about 180° C.

*Example XXX*

A mixture of 5α-androstan-3β-ol-17-one (1 g.), N-methylbenzylamine (4 ml.) and formic acid (1.1 ml.) was heated under reflux at 170° C. for 20 hours, poured into water and basified. The solid product was filtered off, washed with water and crystallised from acetone, giving 17β-N-methylbenzylamino-5α-androstan-3β-ol, M.P. 171–173° C., not depressed by a specimen prepared as in Example XXIX. This compound was converted into 17β-N - methylbenzylamino-3β-N-methylcyclohexylamino-5α-androstane dimethiodide as described in Example XXIX.

*Example XXXI*

A mixture of 5β-androstane-3,17-dione (0.5 g.), anhydrous dimethylamine (1.12 ml.) and formic acid (0.52 ml.) was heated in a sealed tube at 170±10° C. for 16 hours, then poured into aqueous sodium hydroxide. The solution was extracted with chloroform, the washed and dried extract was evaporated and the residue was chromatographed in benzene on alumina, giving 3,17β-bisdimethylamino-5β-androstane, M.P. 105.5–108.5° C., which with methyl iodide in methanol afforded the dimethiodide, M.P. 274–279° C. (decomp.).

*Example XXXII*

A mixture of androst-5-en-3β-ol-17-one (2.5 g.), anhydrous dimethylamine (5.53 ml.) and formic acid (262 ml.) was heated in a sealed tube at 170°±10° C. for 20 hours, cooled, heated with aqueous sodium hydroxide and filtered. The solid was dissolved in aqueous sulphuric acid and the filtered solution was basified, giving 17β-dimethylaminoandrost-5-en-3β-ol, M.P. 211–214° C. Oxidation of this amine (1.9 g.) with cyclohexanone (9.5 ml.) and aluminium isopropoxide (0.75 g.) in toluene (500 ml.) yielded 17β-dimethylaminoandrost-4-en-3-one, M.P. 129–133° C.

A mixture of 17β-dimethylaminoandrost-4-en-3-one (850 mg.), anhydrous magnesium sulphate (500 mg.) and toluene-p-sulphonic acid (50 mg.) was ground up, cooled to −60° C. and treated with anhydrous dimethylamine (5 ml.) in a pressure bottle, which was then kept 48 hours at room temperature. Excess of dimethylamine was removed, and the residue was extracted with benzene. Evaporation of the benzene solution afforded the enamine as a gum (0.68 g.), which was dissolved in methanol (20 ml.). The solution was stirred at 0° C. whilst sodium borohydride (1 g.) was added during 30 minutes, then stirred a further 1½ hours at room temperature, allowed to stand overnight, poured into water and extracted with benzene. The residue obtained on evaporation of the washed and dried benzene solution was chromatographed on alumina, giving 3,17β-bisdimethylaminoandrost-5-ene, M.P. 96–103° C. Treatment wth methyl iodide in methanol afforded the bismethiodide.

*Example XXXIII*

5α-androstane-3β,17β-diol (14 g.) was dissolved in dry pyridine (200 ml.) and methane sulphonyl chloride (30 ml.) was added. The mixture was allowed to stand for 72 hours at 0° C., then it was poured into water (2 l.) and the precipitate was filtered off. The product was crystallised from ethanol (400 ml.) giving 3β,17β-dimethanesulphonyloxy-5α-androstane, M.P. 151–153° C.

The foregoing dimethanesulphonate (17 g.) was heated under reflux in pyrrolidine (50 ml.) for 18 hours. The solvent was removed in vacuo, the residue was basified with aqueous sodium hydroxide and the precipitate washed with water and crystallised from methanol, giving 17β-methanesulphonyloxy - 3α - pyrrolidino-5α-androstane, M.P. 161–164° C.

A mixture of this methanesulphonate (2.5 g.) and sodium azide (1.0 g.) was heated at 160° C. in N-methyl-2-pyrrolidone (10 ml.). After 6 hours the reaction mixture was poured into aqueous sodium hydroxide. The precipitate was filtered off, dried, dissolved in benzene and the solution was filtered through alumina (75 g.). Elution with benzene gave 17α-azido-3α-pyrrolidino-5α-androstane as a pale yellow oil.

17α-azido-3α-pyrrolidino-5α-androstane (0.9 g.) was dissolved in dry ether (100 ml.), and the solution was added to a suspension of lithium aluminium hydride (0.5 g.) in dry ether (100 ml.). The mixture was heated under reflux for 4 hours, and excess of hydride was destroyed by dropwise addition of cold ethyl acetate. Water (25 ml.) was added, and the ethereal solution was separated, dried and evaporated to dryness. The residue in benzene was chromatographed on alumina (30 g.). 17α-amino-3α-pyrrolidino-5α-androstane, which gave a positive Rimini test, was eluted with chloroform and was obtained as a colourless oil.

The 17α-amine compound (0.42 g.) was heated with formic acid (2.5 ml.) and 40% aqueous formaldehyde (2.5 ml.) on a steam bath for 4 hours. The cooled reaction mixture was dissolved in ether and shaken with aqueous methanesulphonic acid. The aqueous extracts were basified and extracted successively with chloroform and ethyl acetate. The organic extracts were washed with water, combined and dried. The solvents were removed in vacuo and the oily residue was chromatographed on alumina (20 g.). Elution with benzene-light petroleum (B. P. 40–60° C.) afforded 17α-dimethylamino-3α-pyrrolidino-5α-androstane as a colourless oil [dipicrate, M.P. 226–227° C. (decomp.)] which was converted by treatment with methyl iodide-methanol into the dimethiodide.

The present invention includes within its scope pharmaceutical compositions which comprise, as active ingredient, at least one of the bis-quaternary salts of Formula I in association with a pharmaceutical carrier, which may be a solid material or a liquid. In clinical practice the compounds of the present invention will normally be administered by injection so that compositions suitable for parenteral administration are preferred.

Preparations for parenteral administration are preferably in the form of sterile solutions in water of readily soluble salts. However, sterile solutions in other suitable solvent media can be employed as also may sterile suspensions of sparingly soluble salts in water, oil or other inert solvents such as propylene glycol, with or without the addition of soluble or insoluble diluents and/or solid or liquid excipients. They may be sterilised by, for example, filtration through a bacteria-retaining filter, by incorporation in the compositions of sterilizing agents, by irradiation, or by heating. Such compositions may also take the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at the same time. The preferred percentage of active substances in the pharmaceutical compositions is about 0.01 to 5%.

The following examples—directed to the preparation of solutions suitable for parenteral administration—illustrate pharmaceutical compositions according to the invention.

*Example XXXIV*

| | |
|---|---|
| 3β,17β-dipyrrolidino-5α-androstane dimethochloride | 10 g. |
| Sodium chloride | 7.2 g. |
| Distilled water | Up to 1000 ml. |

A solution was prepared by dissolving the quaternary ammonium salt and the sodium chloride in the distilled water. The solution was filtered, and filled into ampoules which were sterilised in an autoclave.

In a similar manner, a solution of 3β,17β-bisdimethylamino-5α-androstane bismethiodide (10 g.) and sodium chloride (7.5 g.) in water (1000 ml.) was prepared and, after filtration, filled into ampoules, which were sterilised in an autoclave.

*Example XXXV*

| | |
|---|---|
| 3β,17β-dipyrrolidino-5α-androstane dimethochloride | 50 g. |
| Distilled water | Up to 1000 ml. |

A solution prepared by dissolving the quaternary ammonium salt in the distilled water was filtered and filled into ampoules, which were sterilised in an autoclave.

Preparations suitable for parenteral administration, for example those obtained in Examples XXXIV and XXXV, may be administered to patients prior to surgery to relax smooth muscle.

I claim:
1. A compound of the formula:

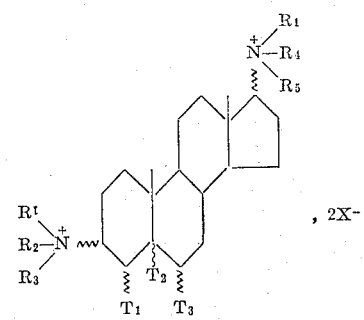

wherein $R_1$ is a member selected from the class consisting of alkyl and alkenyl of up to 6 carbon atoms, and benzyl, $R_2$, $R_3$, $R_4$, and $R_5$ represent, when taken singly, a member selected from the class consisting of alkyl of up to 6 carbon atoms, cyclohexyl, and benzyl, and the pairs $R_2$ and $R_3$, and $R_4$ and $R_5$, when taken together with the nitrogen to which they are attached, collectively represent a member selected from the class consisting of pyrrolidino, piperidino, morpholino, hexamethyleneimino, and N-ethoxycarbonylpiperazino, $T_1$, $T_2$ and $T_3$ when taken singly represent hydrogen atoms, and $T_1$ and $T_2$ when taken together, and $T_2$ and $T_3$ when taken together, represent a single bond, the remaining T symbols representing hydrogen, and X represents a non-toxic anion.

2. A non-toxic dimetho-salt of 3β,17β-dipyrrolidino-5α-androstane.

3. A non-toxic dietho-salt of 3β,17β-dipyrrolidino-5α-androstane.

4. A nontoxic dimetho-salt of 3β,17β-dipiperidino-5α-androstane.

5. A non-toxic dietho-salt of 3β,17β-dipiperidino-5α-androstane.

6. A non-toxic dimetho-salt of 3β,17β-dimorpholino-5α-androstane.

7. A non-toxic dietho-salt of 3β,17β-dimorpholino-5α-androstane.

8. A non-toxic dimetho-salt of 3β,17β-dihexamethylene-imino-5α-androstane.

9. A non-toxic dietho-salt of 3β,17β-dihexamethylene-imino-5α-androstane.

10. A non-toxic dimetho-salt of 3α,17β-dipiperidino-5α-androstane.

11. A non-toxic dietho-salt of 3α,17β-dipiperidino-5α-androstane.

12. A non-toxic dimetho-salt of 3β,17β-dipyrrolidino-androst-5-ene.

13. A non-toxic dietho-salt of 3β,17β-dipyrrolidino-androst-5-ene.

14. A non-toxic dimetho-salt of 3β,17β-bisdimethyl-amino-5α-androstane.

15. A non-toxic dietho-salt of 3β,17β-bisdimethyl-amino-5α-androstane.

16. A non-toxic dimetho-salt of 3β,17β-bisdiethyl-amino-5α-androstane.

17. A non-toxic dietho-salt of 3β,17β-bisdiethylamino-5α-androstane.

18. A dimetho-salt according to claim 2 comprising non-toxic halide anions.

19. A dietho-salt according to claim 3 comprising non-toxic halide anions.

20. A dimetho-salt according to claim 4 comprising non-toxic halide anions.

21. A dietho-salt according to claim 5 comprising non-toxic halide anions.

22. A sterile pharmaceutical composition which comprises, as active ingredient, at least one compound of the formula:

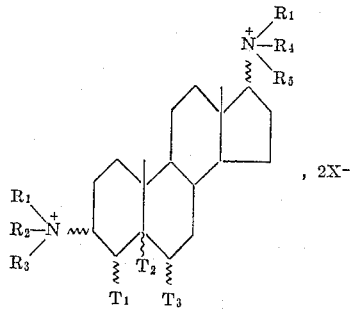

wherein $R_1$ is a member selected from the class consisting of alkyl and alkenyl of up to 6 carbon atoms, and benzyl, $R_2$, $R_3$, $R_4$, and $R_5$ represent, when taken singly, a member selected from the class consisting of alkyl of up to 6 carbon atoms, cyclohexyl, and benzyl, and the pairs $R_2$ and $R_3$, and $R_4$ and $R_5$, when taken together with the nitrogen to which they are attached, collectively represent a member selected from the class consisting of pyrrolidino, piperidino, morpholino, hexamethylene-imino, and N-ethoxycarbonylpiperazino, $T_1$, $T_2$ and $T_3$ when taken singly represent hydrogen atoms, and $T_1$ and $T_2$ when taken together, and $T_2$ and $T_3$ when taken together, represent a single bond, the remaining T symbols representing hydrogen, and X represents a non-toxic anion, in association with a liquid pharmaceutical carrier, the amount of active ingredient in the composition being about 0.01 to 5% by weight of the composition.

References Cited by the Examiner

UNITED STATES PATENTS 2,752,338   6/56   Herr et al. _____ 260—239.5
2,886,564   5/59   Holysz _____ 260—239.5

LEWIS GOTTS, *Primary Examiner.*